(12) United States Patent
Farmer et al.

(10) Patent No.: US 11,435,881 B1
(45) Date of Patent: Sep. 6, 2022

(54) INTEGRATED SMART GRAPHICAL USER INTERFACE FOR CUSTOMER MANAGEMENT SYSTEMS

(71) Applicant: UIPCO, LLC, San Antonio, TX (US)

(72) Inventors: William Daniel Farmer, Carrollton, TX (US); Andre Rene Buentello, San Antonio, TX (US); Jose L. Romero, Jr., San Antonio, TX (US); Priyadarshini Badugu, Frisco, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 16/915,700

(22) Filed: Jun. 29, 2020

(51) Int. Cl.
*G06F 3/0484* (2022.01)
*H04L 67/306* (2022.01)

(52) U.S. Cl.
CPC .......... *G06F 3/0484* (2013.01); *H04L 67/306* (2013.01)

(58) Field of Classification Search
CPC ....... G06F 3/0484; G06F 9/453; H04L 67/306
See application file for complete search history.

(56) References Cited

U.S. PATENT DOCUMENTS

| | | | |
|---|---|---|---|
| 8,225,331 B2 * | 7/2012 | Jaffer | G06F 9/451 719/317 |
| 8,666,921 B2 * | 3/2014 | Fisher, Jr. | G06Q 10/06 706/46 |
| 9,130,892 B2 * | 9/2015 | Singh | G06Q 30/01 |
| 9,715,496 B1 * | 7/2017 | Sapoznik | G10L 15/26 |
| 10,671,248 B2 * | 6/2020 | Muramoto | G06F 3/04886 |
| 11,055,336 B1 * | 7/2021 | Hernandez | G06Q 40/08 |
| 2006/0085515 A1 * | 4/2006 | Kurtz | H04L 51/04 709/207 |

(Continued)

FOREIGN PATENT DOCUMENTS

| | | | | |
|---|---|---|---|---|
| CN | 113597607 A | * | 3/2020 | |
| WO | WO-2020036194 A1 | * | 2/2020 | ......... G06F 16/9038 |

OTHER PUBLICATIONS

Method and System for Providing Technical Support by Parsing Keywords during Online Chat, Mar. 11, 2012, 3 pages (Year: 2012).*

*Primary Examiner* — Yongjia Pan
(74) *Attorney, Agent, or Firm* — Perkins Coie LLP

(57) ABSTRACT

A customer management system can be designed to provide an integrated smart graphical user interface. For example, a computing device can receive information that includes a topic of conversation for a chat-based communication; initiate, via a first graphical user interface (GUI), the chat-based communication with another computing device after the information is received; display, via a second GUI, the user profile associated with the person, wherein the second GUI is displayed adjacent to and integrated with the first GUI; determine a relationship between one or more words or phrases received via the first GUI from the first computing device and the additional information in the user profile, where the relationship is determined in real-time or near real-time as the one or more words or phrases are received; and display a visual indicator in the second GUI that shows content in the second GUI that is relevant to the determined relationship.

16 Claims, 7 Drawing Sheets

(56) References Cited

U.S. PATENT DOCUMENTS

| | | | | |
|---|---|---|---|---|
| 2008/0005240 | A1* | 1/2008 | Knighton | G06Q 30/016 709/204 |
| 2008/0034060 | A1* | 2/2008 | Fisher | G06Q 30/02 709/218 |
| 2009/0245500 | A1* | 10/2009 | Wampler | H04M 3/5191 379/265.09 |
| 2009/0282106 | A1* | 11/2009 | Jaffer | H04M 3/5191 709/206 |
| 2010/0205544 | A1* | 8/2010 | Brzeski | H04L 12/66 715/758 |
| 2012/0151380 | A1* | 6/2012 | Bishop | G06Q 10/107 715/752 |
| 2012/0324375 | A1* | 12/2012 | Mathews | G06F 16/95 715/760 |
| 2013/0013663 | A1* | 1/2013 | Jaffer | G06Q 30/016 709/202 |
| 2013/0282417 | A1* | 10/2013 | Gaedcke | G06Q 30/0201 705/7.13 |
| 2014/0211934 | A1* | 7/2014 | Jaffer | H04M 3/5191 379/265.09 |
| 2014/0278785 | A1* | 9/2014 | Gaedcke | G06Q 30/0203 705/7.32 |
| 2015/0149557 | A1* | 5/2015 | Mendez | H04L 65/403 709/205 |
| 2015/0256677 | A1* | 9/2015 | Konig | H04M 3/5233 379/265.09 |
| 2016/0283995 | A1* | 9/2016 | Matula | G06Q 30/0613 |
| 2016/0358242 | A1* | 12/2016 | Lagos | G06Q 30/02 |
| 2019/0227822 | A1* | 7/2019 | Azmoon | G06Q 30/016 |
| 2019/0265865 | A1* | 8/2019 | Yaseen | H04L 51/02 |
| 2021/0005207 | A1* | 1/2021 | Adibi | G10L 21/0272 |

\* cited by examiner ical user interface (GUI).

INTEGRATED SMART GRAPHICAL USER INTERFACE FOR CUSTOMER MANAGEMENT SYSTEMS

TECHNICAL FIELD

This disclosure is directed generally to customer management related systems, methods, and apparatus for integrated smart graphical user interface (GUI).

BACKGROUND

Current and potential customers can communicate with an organization's customer service representative (CSR) by speaking with the CSR or by chatting with the CSR. When a person first tries to chat with a CSR, a chat bot associated with a customer management system may request the person to provide a reason for the interaction. In some cases, the customer management system may provide some options such as pressing a number for an option related to complaints or entering in a short description for the reason for the person's contacting the CSR. After the person provides or enters the requested information, the customer management system sends the requested information to the CSR's computer.

Figure 1:
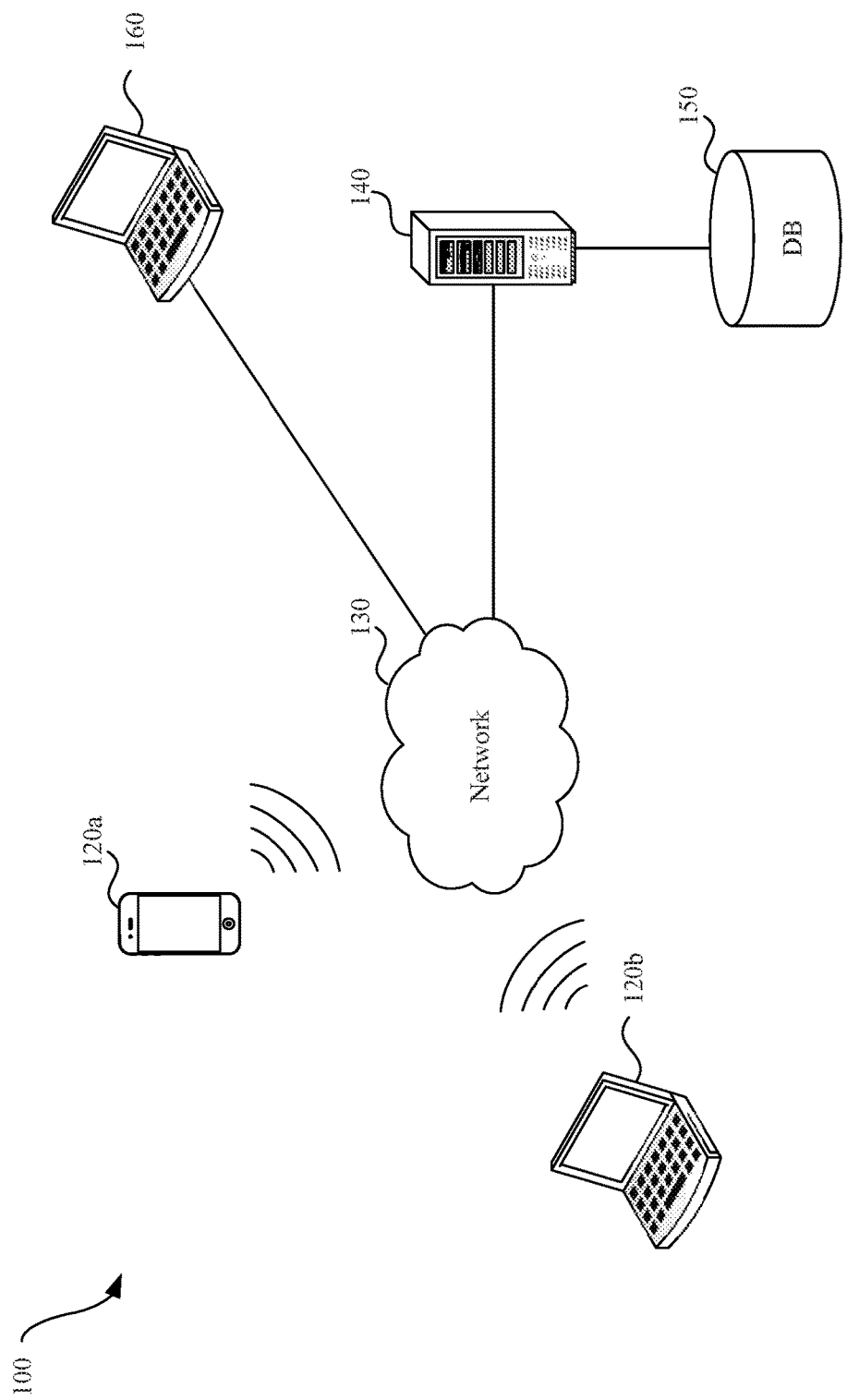
FIG. 1 shows an example of an example customer management system that can implement the integrated smart GUI technology.

The techniques introduced here may be better understood by referring to the following Detailed Description in conjunction with the accompanying drawings, in which like reference numerals indicate identical or functionally similar elements. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

In a conventional customer management system, a customer service representative (CSR) can use a computer to communicate or chat with a customer via the customer's device. However, there are several technical problems with conventional customer management system. For example, when a CSR speaks with one customer, the CSR's computer may have one window with which the CSR chats with the customer and another window on which the CSR may manually perform a search on the customer's account to address an issue experienced by the customer. Thus, for each customer, the CSR's computer display can include at least two windows, where each window is not organized to facilitate ease of usage by the CSR, and where the information in one or more windows for each customer is not dynamically updated to identify content relevant to the customer's chat content. Furthermore, in some cases, the CSR's computer may waste computational resources by keeping the information in one window displayed on in its memory when the CSR has closed the chat-related window for that customer. These technical problems are exacerbated if the CSR is chatting with multiple customers where the CSR is expected to manually manage multiple windows and to manually search content on related to the customers' accounts.

To overcome at least some of the issues described above for a conventional customer management system, this patent document describes systems, apparatus, and methods for an integrated smart graphical user interface (GUI). Such a technique can organize the windows shown on the display of the CSR's computer and can enable the CSR's computer to identify and highlight content from the customer's account that is relevant to the chat transcript.

FIG. 1 shows an example of an example customer management system that can implement the integrated smart GUI technology. The customer management system 100 includes user devices 120a-120b that can communicate with a CSR's computer 160 via chat. A request for a chat from the user devices 120a-120b can be sent to or can be managed by the chat server 140. For example, when a person operating her user device 120a clicks a link on a website to initiate chat with a CSR, the chat server 140 may request certain information that can enable the chat server 140 to route the chat to an appropriate CSR's computer, and that can enable the chat server 140 to authenticate the person operating her user device 120a.

The chat server 140 includes an authentication module (shown as 240 in FIG. 2) that can authenticate the person that initiated the chat via the user device 120a. For example, after the person clicks on the link on the website to initiate the chat, the authentication module can send one or more questions requesting the person to provide certain identifying information (e.g., name, account number, etc.). When the authentication module receives the information that identifies the person, the authentication module can determine whether the received information is associated with a user profile previously stored in a database 150. A user profile can provide information about the person and/or information about one or more accounts associated the person.

In one implementation example, the authentication module can request and receive the person's name and/or account identifier (e.g., account number). The authentication module can search the database 150 to find one or more accounts associated with the received name and account identifier. The authentication module can also retrieve from a database a user profile associated with the name and/or account identifier. The user profile may include additional information about the one or more account (e.g., balance amounts per account, credit card transactions within a pre-determined time period (e.g. 1-month), insurance limits, home address, birthdate of the person, etc.). In some embodiments, the information provided by the user profile can be considered to provide a quick snapshot of the account(s) associated with the person while minimizing computational resources used by the chat server 140. For example, if the user profile provides information about transaction within a pre-determined time period (e.g., one-month), then the authentication module does not have to search the database 150 for all transactions associated with the person. Such a limited set of information can not only advantageously limit the computational resources used by the chat server, but it can often be helpful to address the person's concerns on the chat that may be about a recent transaction. The authentication module sends the user profile to a computer associated with the CSR to whom the chat is routed by the routing module as discussed below.

The chat server 140 also includes a routing module (shown as 250 in FIG. 2) that can route to an appropriate CSR's computer based on a topic of conversation. For example, after the person clicks on the link on the website to initiate the chat, the routing module can send one or more questions requesting the person to provide a reason for which the person initiated the chat. The person can type in the chat that he or she wants to, for example, "dispute recent transaction on credit card" or "report fraud on debit card" or "request insurance quote." These responses can be considered a topic of conversation. Based on the topic of conversation received by the routing module, the routing module can identify an appropriate CSR to whom the chat is directed. In an implementation example, the routing module can include a look up table (LUT) that can include an Internet Protocol (IP) addresses of computers associated with the CSRs, the corresponding employee identifiers of the CSRs, and the corresponding topic(s) that the CSRs are experienced to handle. An example of a LUT is shown below:

| IP Address | Employee Identifier | Topic(s) |
|---|---|---|
| 10.10.20.1 | 002151 | Insurance, Insurance quote |
| 10.10.20.5 | 016587 | Banking, Credit Card |
| ... | ... | ... |

The routing module can match the topic of conversation provided by the person to a topic in the LUT and can route the chat to a CSR who is experienced in handling that topic.

The computer 160 of the CSR includes a GUI management module (shown as 340 in FIG. 3) that initiates a first GUI with which the CSR can chat with the person associated with the user device 120a. The GUI management module can initiate the first GUI by opening up a window on a display of the CSR when the GUI management module receives the topic of conversation from the routing module of the chat server 140. The GUI management module can also receive user profile from the authentication module of the chat server 140.

Figure 4:
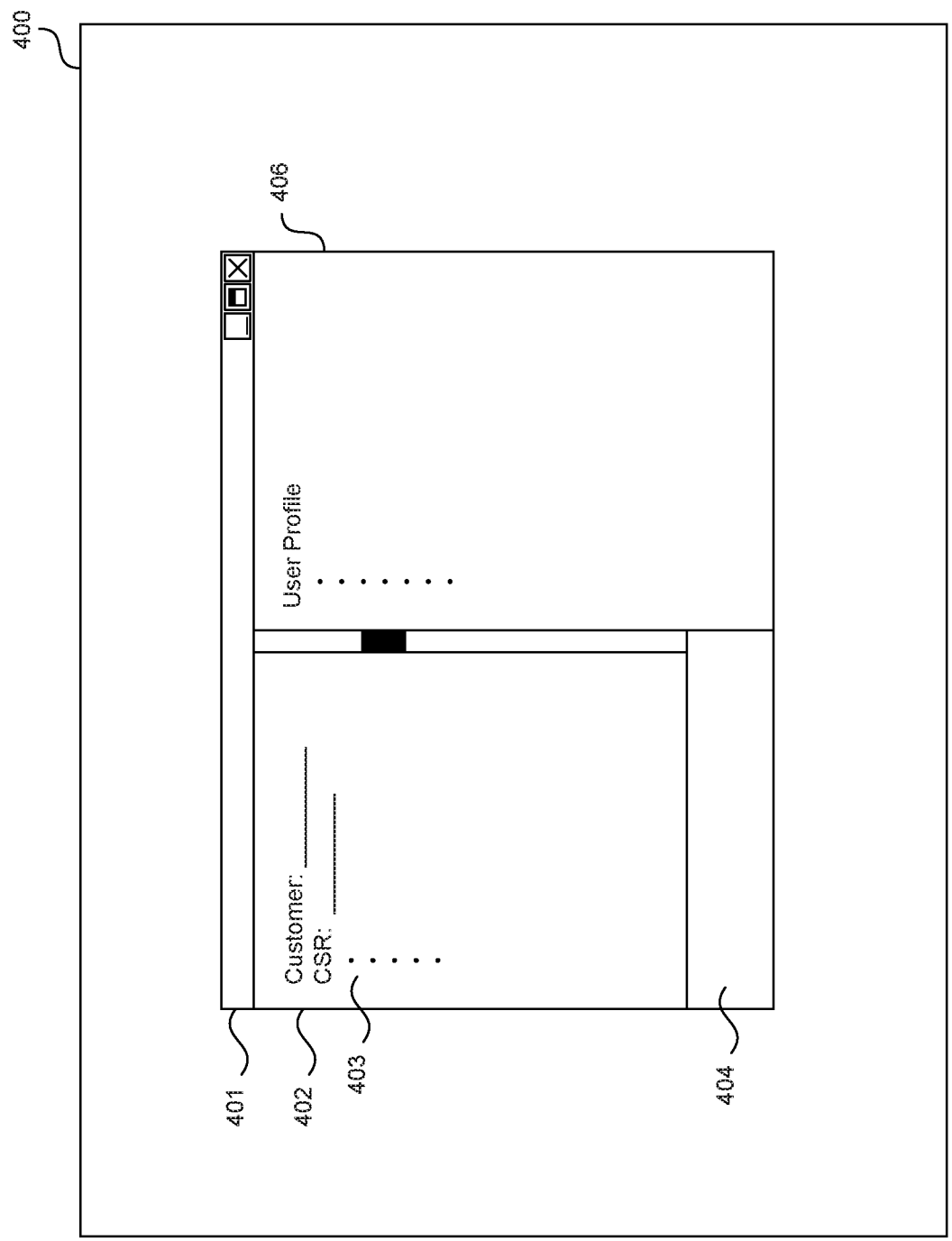
FIG. 4 shows an example integrated GUI displayed on a CSR's computer.

FIG. 4 shows an example integrated GUI displayed on a CSR's computer. The GUI management module can display one or more integrated GUIs on a monitor 400 of the CSR's computer. FIG. 4 shows one example of an integrated GUI 401. An integrated GUI can include a single window within which the first GUI 402 and a second GUI 406 can be located. The first GUI 402 and the second GUI 406 can be located next to or adjacent to each other. Furthermore, since the two GUIs 402, 406 are located within a single window, both GUIs can be moved at a same time or can be moved simultaneously. In some embodiments, the GUI management module can display the two GUIs 402, 406 with two separate windows but still next to each other or connected to each other so that when a first window is moved, the second window simultaneously moves with the first window. Such separate but connected windows are considered to be an integrated GUI. Thus, the first GUI 402 and the second GUI 406 can be simultaneously movable.

On the left side of the integrated GUI 401 is shown a first GUI 402 that can include one region 403 where the first GUI shows a transcript of the chat between the CSR and the person. The first GUI may include a slider (shown to the right of the first GUI 402) that can enable the CSR to move the transcript up or down to check the transcript. The first GUI 402 also include another region 404 where the CSR can type a response or ask a question to the person.

On the right side of the integrated GUI 401 is shown a second GUI 406. The second GUI 406 may include user profile that includes additional information that describes one or more accounts associated with the person. The additional information may include, for example, name of the person and information associated with one or more accounts. One example of an information associated with a banking-related account includes an account identifier, checking/savings account balance(s), recent transactions. Another example of information associated with a home insurance-related account includes home address, insurance limits or coverages, recent claims, etc.

The CSR's computer also includes a smart visual indicator module (shown as 350 in FIG. 3) that can assist the CSR by identifying relevant information from the user profile based on the conversation in the chat transcript 403. For example, the GUI management module can receive and display on the chat transcript 403 one or more words or phrases sent to the CSR's computer by the person's user device. The smart visual indicator module can determine, based on the received word(s) or phrase(s) (e.g., "balance" or "fraud with a transaction yesterday") the content from the user profile that would be most relevant to the word(s) or phrase(s). Thus, the smart visual indicator module can determine a relationship between the word(s) or phrase(s) received and displayed by the GUI management module and the content associated with the user profile. The smart visual indicator module can determine the relationship between words(s) or phrase(s) received and the content associated with the user profile by performing a search of text associated with the user profile using the word(s) or phrase(s), and identify content from the user profile relevant to the word(s) or phrase(s). A relevant content in the user profile may include word(s) (e.g., checking account) in the user profile that is same as or similar to word(s) (e.g., "checking acct") in the chat transcript 403.

In some embodiments, the smart visual indicator module can determine the relationship between the word(s) or phrase(s) and the user profile related content in real-time or near real-time. For example, a real-time computation can include the smart visual indicator module searching for content in the user profile based on the word(s) or phrase(s) received as soon as the GUI management module receives the word(s) or phrase(s) from the person's user device. Near real-time computation can include the smart visual indicator module searching for content in the user profile based on the word(s) or phrase(s) received within a half second of when the GUI management module receives the word(s) or phrase(s) from the person's user device.

If the smart visual indicator module determines a presence of a relationship between content in the user profile and word(s) or phrase(s) in the chat transcript 403, the smart visual indicator module can display with a visual indicator the content from the user profile that is determined to be relevant to the word(s) or phrase(s) in the chat transcript 403. For example, if the chat transcript 403 states that the person has an "issue with a transaction from yesterday," then the smart visual indicator module can identify the in the user profile the transaction(s) performed by the person yesterday and can highlight those transaction(s). The smart visual indicator module can change the visual appearance of the text of the transactions(s) by, for example, changing the color of the text of those transaction(s), putting a box around those transaction(s), adding a highlighted around the text associated with the transaction(s), underlining the transaction(s), making the text of the transaction(s) bold, etc.

In some embodiments, the smart visual indicator can also change the visual appearance of the text in the chat transcript 403 to match the visual appearance of the content in the user profile that is identified to be relevant to the word(s) or phrase(s) in the chat transcript 403. For example, if a content in the user profile is highlighted yellow, the word(s) or phrase(s) that is related to the highlighted user profile content can also be highlighted yellow by the smart visual indicator module. In this way, the smart visual indicator module can visually associate the text from the text transcript with the contest in the user profile. Thus, the smart visual indicator module can change the visual appearance of one or more text in the first GUI 402 or the second GUI 406 or both the first and second GUIs 402, 406.

Figure 2:
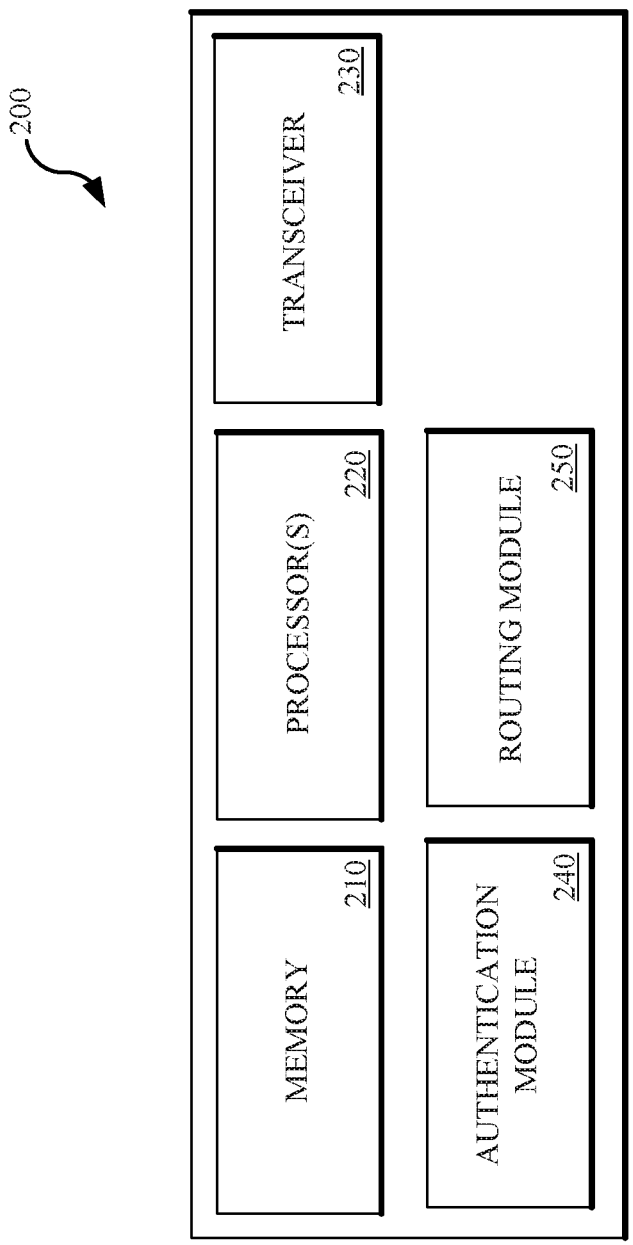
FIG. 2 shows a block diagram of a chat server operated to receive information from a person associated with a user device and to route the person to chat with an appropriate customer service representative (CSR).

FIG. 2 shows a block diagram of a chat server 200 operated to receive information from a person associated with a user device and to route the person to chat with an appropriate CSR as described in this patent document. The chat server 200 includes at least one processor 220 and a memory 210 having instructions stored thereupon. The instructions upon execution by the processor 220 configure the chat server 200 to perform the operations described for the authentication module 240 and the routing module 250 in FIGS. 1, 4, and 5A, and in the various embodiments of this patent document.

Figure 3:
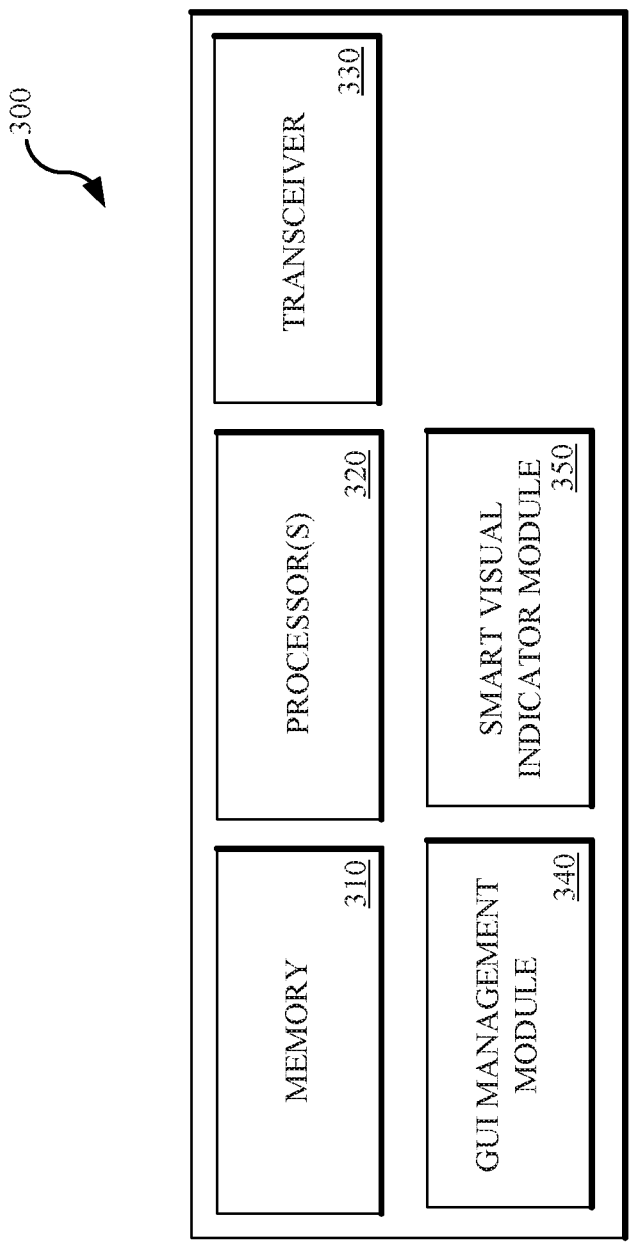
FIG. 3 shows a block diagram of a computer 300 operated by a CSR to chat with a person and to provide an integrated GUI.

FIG. 3 shows a block diagram of a computer 300 operated by a CSR to chat with a person and to provide an integrated GUI as described in this patent document. The computer 300 includes at least one processor 320 and a memory 310 having instructions stored thereupon. The instructions upon execution by the processor 320 configure the computer 300 to perform the operations described for the GUI management module 340 and the smart visual indicator module 350 in FIGS. 1, 4, and 5B, and in the various embodiments of this patent document.

Figure 5A:
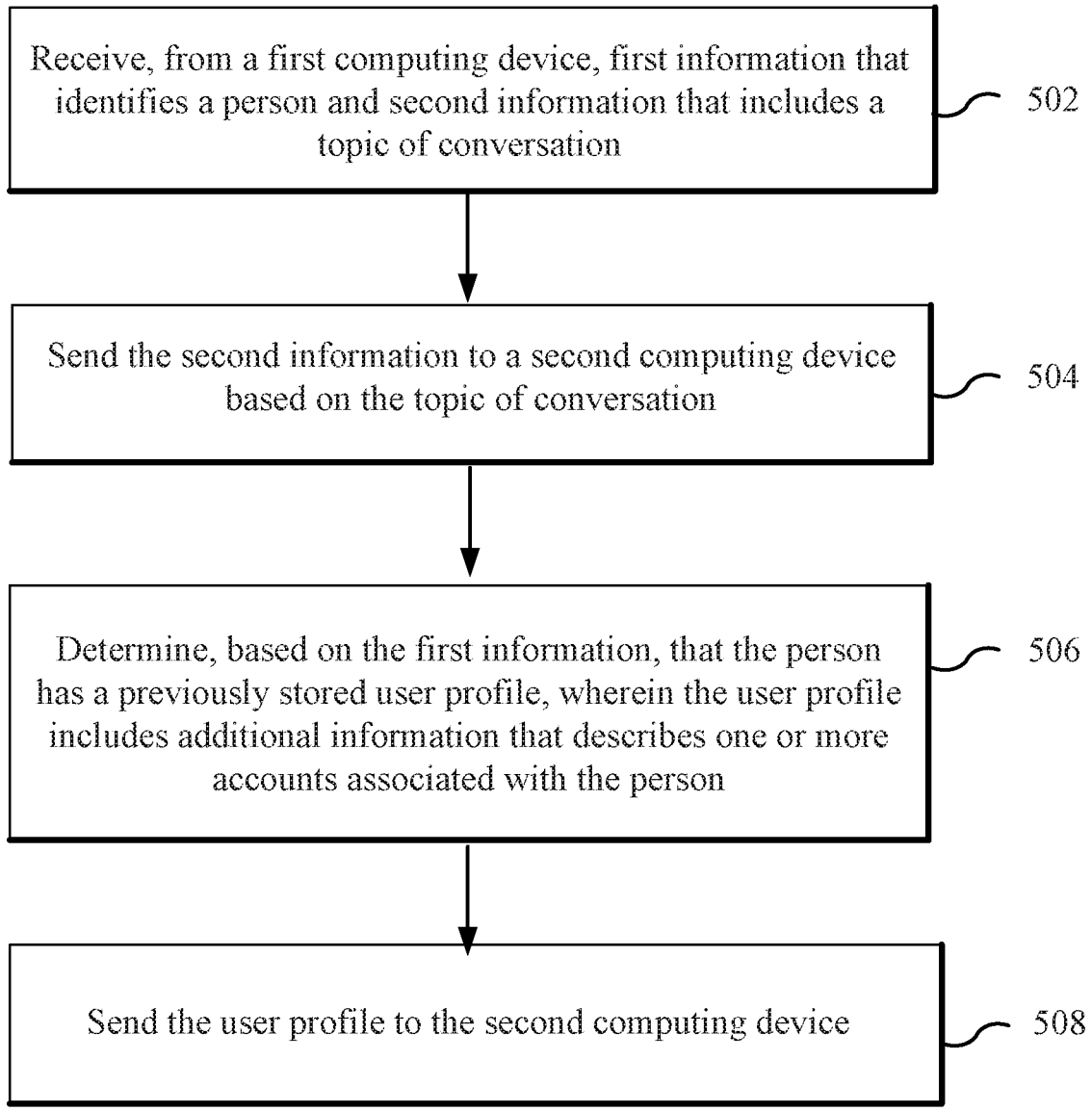
FIG. 5A shows an example flow diagram of operations performed by a chat server.

FIG. 5A shows an example flow diagram of operations performed by a chat server. At operation 502, the authentication module receives, from a first computing device (e.g., a user device of a person), first information that identifies a person. At operation 502, the routing module receives second information that includes a topic of conversation. At operation 504, the routing module sends the second information to a second computing device based on the topic of conversation, where the second information triggers the second computing device to initiate a chat-based communication with the first computing device.

At operation 506, the authentication module determines, based on the first information, that the person has a previously stored user profile, where the user profile includes additional information that describes one or more accounts associated with the person. The first information may include an account identifier and a name associated with the one or more accounts. At operation 508, the authentication module sends the user profile to the second computing device.

Figure 5B:
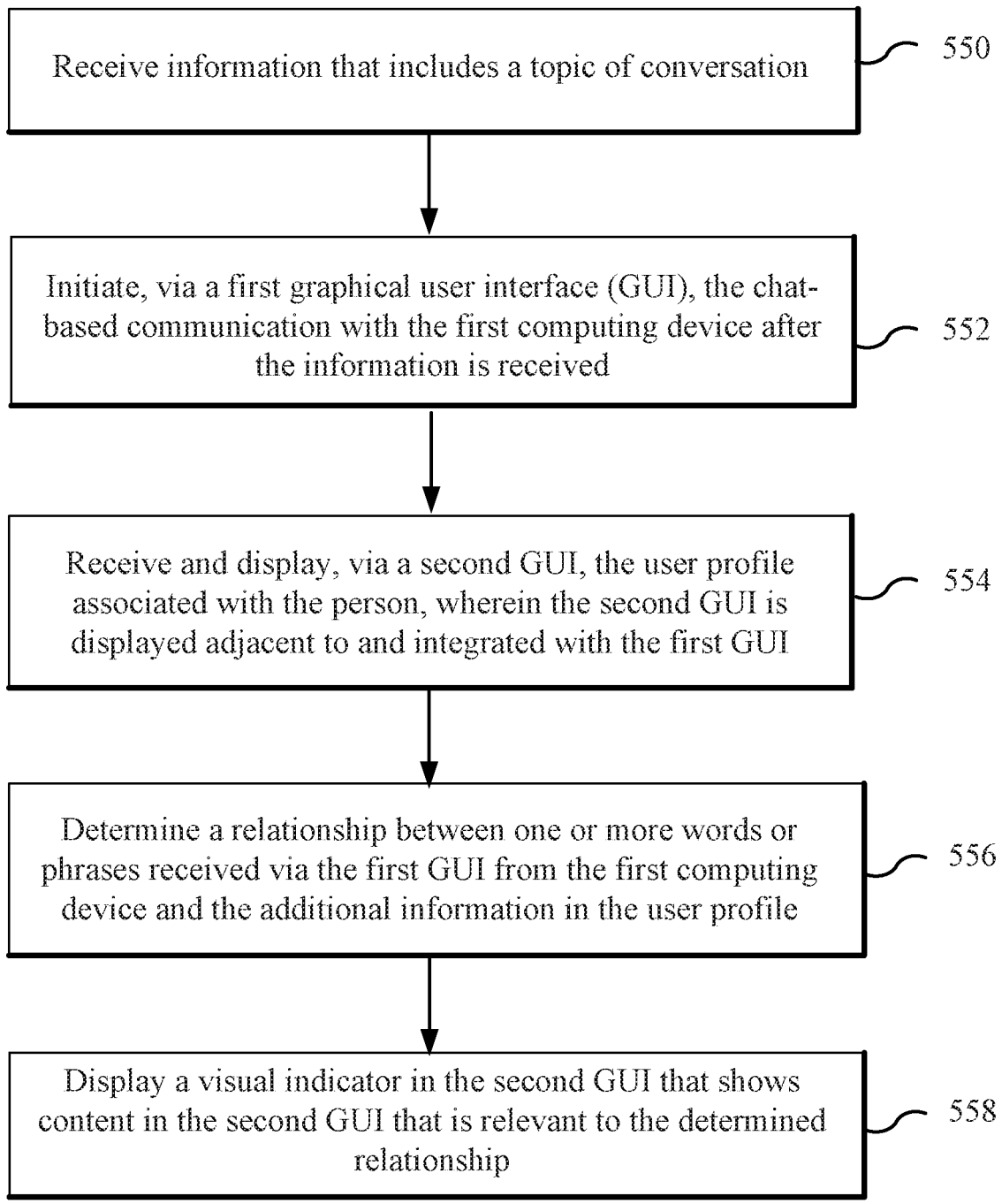
FIG. 5B shows an example flow diagram of operations performed by a computer associated with a CSR.

FIG. 5B shows an example flow diagram of operations performed by a computer associated with a CSR. At operation 550, the GUI management module receives information that includes a topic of conversation from a chat server (e.g., the second information in FIG. 5A). At operation 552, the GUI management module initiates, via a first GUI, the chat-based communication with the first computing device after the second information is received. At operation 554, the GUI management module receives and displays, via a second GUI, a user profile associated with the person, where the GUI management module receives the second information from the chat server, and where the second GUI is displayed adjacent to and integrated with the first GUI. In some embodiments, the GUI management module configures the first GUI and the second GUI in one or more integrated GUIs so that the first GUI and the second GUI are simultaneously moveable. In some embodiments, the first GUI and the second GUI are integrated into a single software window.

At operation 556, the smart visual indicator module determines a relationship between one or more words or phrases received via the first GUI from the first computing device and the additional information in the user profile, where the relationship is determined in real-time or near real-time as the one or more words or phrases are received. In some embodiments, the smart visual indicator module performs a search in the user profile using the one or more words or phrases in real-time or near real-time as the words or phrases are received; and identifies content from the user profile relevant to the one or more words or phrases, wherein the content identified from the user profile is displayed with the visual indicator in the second GUI At operation 558, the smart visual indicator module displays a visual indicator in the second GUI that shows content in the second GUI that is relevant to the determined relationship. In some embodiments, the smart visual indicator module displays a second visual indicator in the first GUI that show content in the first GUI that is relevant to the determined relationship, wherein the second visual indicator in the first GUI is the same as the visual indicator in the second GUI. In some embodiments, the smart visual indicator module may change a visual appearance of a text in any one or more of the first GUI and the second GUI.

Figure 6:
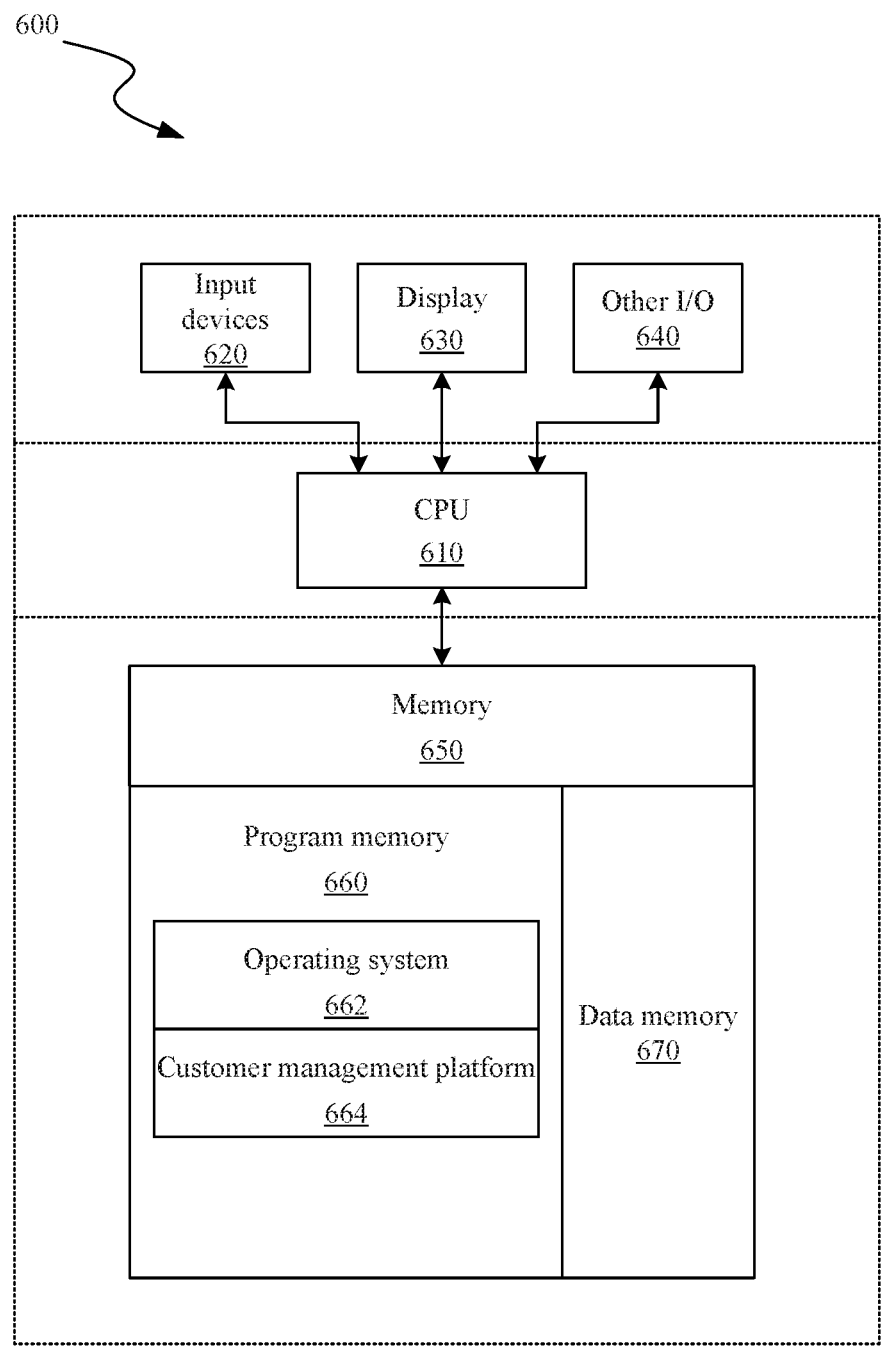
FIG. 6 is a block diagram illustrating an overview of devices on which some implementations of the CSR's computer can operate.

FIG. 6 is a block diagram illustrating an overview of devices on which some implementations of the CSR's computer can operate. The devices can comprise hardware components of a device 600, such as the CSR's computer that includes a customer management platform 664 that can perform operation of the GUI management module and/or smart visual indicator module as described in this patent document. Device 600 can include one or more input devices 620 that provide input to the CPU (processor) 610, notifying it of actions. The actions are typically mediated by a hardware controller that interprets the signals received from the input device and communicates the information to the CPU 610 using a communication protocol. Input devices 620 include, for example, a mouse, a keyboard, a touchscreen, an infrared sensor, a touchpad, a wearable input device, a camera- or image-based input device, a microphone, or other user input devices.

CPU 610 can be a single processing unit or multiple processing units in a device or distributed across multiple devices. CPU 610 can be coupled to other hardware devices, for example, with the use of a bus, such as a PCI bus or SCSI bus. The CPU 610 can communicate with a hardware controller for devices, such as for a display 630. Display 630 can be used to display text and graphics. In some examples, display 630 provides graphical and textual visual feedback to a person operating the device 600. In some implementations, display 630 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 640 can also be coupled to the processor, such as a network card, video card, audio card, USB, FireWire or other external device, camera, printer, speakers, CD-ROM drive, DVD drive, disk drive, or Blu-Ray device.

In some implementations, the device 600 also includes a communication device capable of communicating wirelessly or wire-based with a network node (e.g., a server) or with a user device (e.g., a laptop, desktop, or mobile device) or with one or more computers (e.g., desktop or laptop) associated with the customer service representatives. The communication device can communicate with another device or a server through a network using, for example, TCP/IP protocols. Device 600 can utilize the communication device to distribute operations across multiple network devices.

The CPU 610 can have access to a memory 650. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 650 can include program memory 660 that stores programs and software, such as an operating system 662 and customer management platform 664. The customer management platform 664 may include modules or processes or methods associated with the CSR's computer (e.g., as shown in and as described for the modules in FIG. 2). Thus, for example, the memory 650 may store instructions that upon execution by CPU 610 configure the device 600 to perform the operations described for the CSR's computer in FIGS. 1, 3, 5B and/or in the various embodiments described in this patent document. Memory 650 can also include data memory 670 that can include the various scores described in this patent document, which can be provided to the program memory 660 or any element of the device 600.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, portable electronic devices such as smartphones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Those skilled in the art will appreciate that the components illustrated in FIG. 1-5B described above, and in each of the flow diagrams, may be altered in a variety of ways. For example, the order of the logic may be rearranged, sub-steps may be performed in parallel, illustrated logic may be omitted, other logic may be included, etc. In some implementations, one or more of the components described above can execute one or more of the processes described above. Furthermore, a non-transitory machine-readable medium having machine executable instructions stored thereon that, when executed by one or more processors, direct the one or more processors to perform the method(s) or technique(s) described in this patent document.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively.

Several implementations of the disclosed technology are described above in reference to the figures. The computing devices on which the described technology may be implemented can include one or more central processing units, memory, user devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A customer management system for an integrated smart graphical user interface, comprising:
    a server including a first processor configured to:
        receive, from a first computing device, first information that identifies a person and second information that includes a topic of conversation;
        send the second information to a second computing device based on the topic of conversation, wherein the second information triggers the second computing device to initiate a chat-based communication with the first computing device;
        determine, based on the first information, that the person has a previously stored user profile, wherein the user profile includes additional information that describes one or more accounts associated with the person;
        send the user profile to the second computing device;
    the second computing device including a second processor configured to:
        initiate, via a first graphical user interface (GUI), the chat-based communication with the first computing device after the second information is received;
        display, via a second GUI, the user profile associated with the person, wherein the second GUI is displayed adjacent to and integrated with the first GUI;
        determine a relationship between one or more words or phrases received via the first GUI from the first computing device and the additional information in the user profile that is within a pre-determined period of the chat-based communication, wherein the relationship is determined in real-time or near real-time as the one or more words or phrases are received; and
        display a visual indicator in the second GUI that shows content in the second GUI that is relevant to the determined relationship by changing a visual representation of the one or more words or phrases in the first GUI and changing a visual representation of text in the additional information in the user profile in the second GUI, wherein the visual representation of the one or more words or phrases in the first GUI matches the visual representation of the text in the additional information in the second GUI.

2. The customer management system of claim 1, wherein the first GUI and the second GUI are simultaneously moveable.

3. The customer management system of claim 1, wherein the second processor of the second computing device is further configured to:
    display a second visual indicator in the first GUI that show content in the first GUI that is relevant to the determined relationship, wherein the second visual indicator in the first GUI is the same as the visual indicator in the second GUI.

4. The customer management system of claim 1, wherein the second processor of the second computing device is configured to determine the relationship between the one or more words or phrases received via the first GUI by being configured to:
    perform a search in the user profile using the one or more words or phrases in real-time or near real-time as the words or phrases are received; and
    identify content from the user profile relevant to the one or more words or phrases, wherein the content identified from the user profile is displayed with the visual indicator in the second GUI.

5. The customer management system of claim 1, wherein the first GUI and the second GUI are integrated into a single software window.

6. The customer management system of claim 1, wherein the first information includes an account identifier and a name associated with the one or more accounts.

7. A method of managing an integrated smart graphical user interface, comprising:

receiving, by a second computing device, information that includes a topic of conversation;

initiating, via a first graphical user interface (GUI) of the second computing device, a chat-based communication with a first computing device after the information is received;

receiving and displaying, via a second GUI, a user profile associated with the person, wherein the second GUI is displayed adjacent to and integrated with the first GUI;

determining a relationship between one or more words or phrases received via the first GUI from the first computing device and additional information in the user profile that is within a pre-determined period of the chat-based communication, wherein the relationship is determined in real-time or near real-time as the one or more words or phrases are received; and displaying a visual indicator in the second GUI that shows content in the second GUI that is relevant to the determined relationship by changing a visual representation of the one or more words or phrases in the first GUI and changing a visual representation of text in the additional information in the user profile in the second GUI, wherein the visual representation of the one or more words or phrases in the first GUI matches the visual representation of the text in the additional information in the second GUI.

8. The method of claim 7, wherein the first GUI and the second GUI are simultaneously moveable.

9. The method of claim 7, further comprising:

displaying a second visual indicator in the first GUI that show content in the first GUI that is relevant to the determined relationship, wherein the second visual indicator in the first GUI is the same as the visual indicator in the second GUI.

10. The method of claim 7, wherein the relationship between the one or more words or phrases received via the first GUI is determined by:

performing a search in the user profile using the one or more words or phrases in real-time or near real-time as the words or phrases are received; and identifying content from the user profile relevant to the one or more words or phrases, wherein the content identified from the user profile is displayed with the visual indicator in the second GUI.

11. The method of claim 7, wherein the first GUI and the second GUI are integrated into a single software window.

12. A non-transitory machine-readable medium having machine executable instructions stored thereon that, when executed by one or more processors, direct the one or more processors to perform a method comprising:

receiving, by a second computing device, information that includes a topic of conversation;

initiating, via a first graphical user interface (GUI) of the second computing device, a chat-based communication with a first computing device after the second information is received;

displaying, via a second GUI, the user profile associated with the person, wherein the second GUI is displayed adjacent to and integrated with the first GUI;

determining a relationship between one or more words or phrases received via the first GUI from the first computing device and additional information in the user profile that is within a pre-determined period of the chat-based communication, wherein the relationship is determined in real-time or near real-time as the one or more words or phrases are received; and displaying a visual indicator in the second GUI that shows content in the second GUI that is relevant to the determined relationship by changing a visual representation of the one or more words or phrases in the first GUI and changing a visual representation of text in the additional information in the user profile in the second GUI, wherein the visual representation of the one or more words or phrases in the first GUI matches the visual representation of the text in the additional information in the second GUI.

13. The non-transitory machine-readable medium of claim 12, wherein the first GUI and the second GUI are simultaneously moveable.

14. The non-transitory machine-readable medium of claim 12, wherein the method further comprises:

displaying a second visual indicator in the first GUI that show content in the first GUI that is relevant to the determined relationship, wherein the second visual indicator in the first GUI is the same as the visual indicator in the second GUI.

15. The non-transitory machine-readable medium of claim 12, wherein the relationship between the one or more words or phrases received via the first GUI is determined by:

performing a search in the user profile using the one or more words or phrases in real-time or near real-time as the words or phrases are received; and identifying content from the user profile relevant to the one or more words or phrases, wherein the content identified from the user profile is displayed with the visual indicator in the second GUI.

16. The non-transitory machine-readable medium of claim 12, wherein the first GUI and the second GUI are integrated into a single software window.

* * * * *